*R. Knott,*

*Horse-Power Fastener,*

N⁰ 83,862.   Patented Nov. 10, 1868.

Witnesses.   Inventor
Geo. H. Strong   Richard Knott
J. L. Boone   By his att'ys Dewey & Co.

United States Patent Office.

RICHARD KNOTT, OF SUISUN, CALIFORNIA.

Letters Patent No. 83,862, dated November 10, 1868.

IMPROVEMENT IN HORSE-POWER FASTENER.

The Schedule referred to in these Letters Patent and making part of the same.

*To all whom it may concern:*

Be it known that I, RICHARD KNOTT, of Suisun, county of Solano, State of California, have invented an Improved Mode of Confining Horse-Powers; and I do hereby declare the following description and accompanying drawings are sufficient to enable any person skilled in the art or science to which it most nearly appertains, to make and use my said invention or improvements without further invention or experiment.

The object of my invention is to provide an improved mode of confining horse-powers to the ground, so as to render them steady; and is more especially intended for separators; and it possesses the advantages over other arrangements for the same purpose, of being easier handled, consisting, as it does, of only two pieces of timber, which it is necessary to remove from the machine when moving it from place to place. The planting and removing of the machine from the ground can be done in less time and with less labor than with any other machine now used for the purpose.

To more fully describe my invention, reference is had to the accompanying drawings, forming part of this specification, of which—

Figure 1:
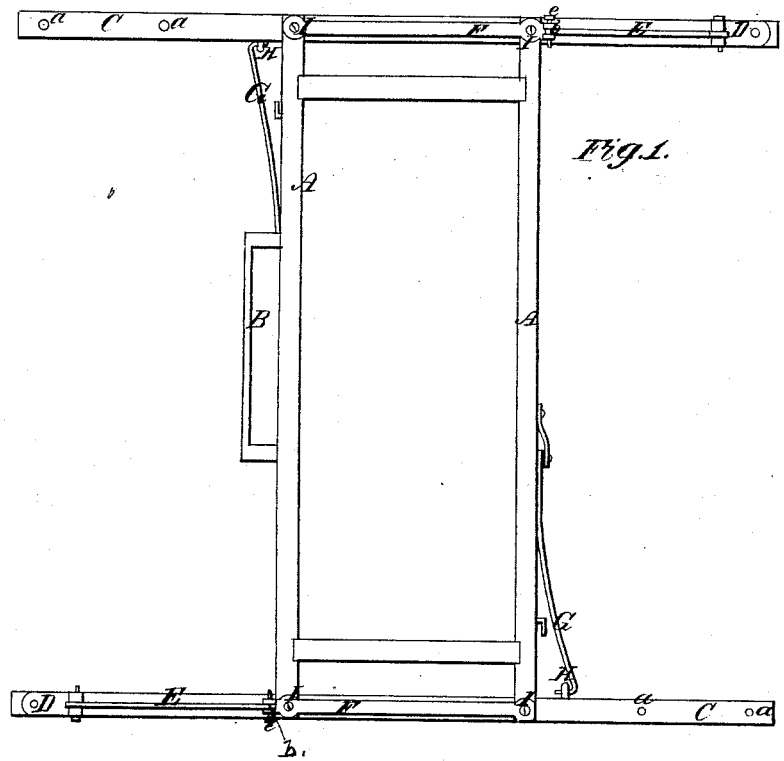
Figure 2:
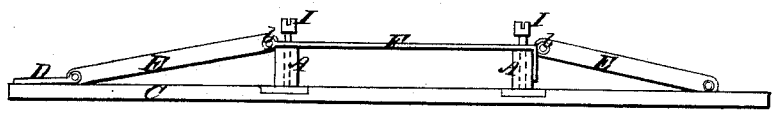
Figure 3:
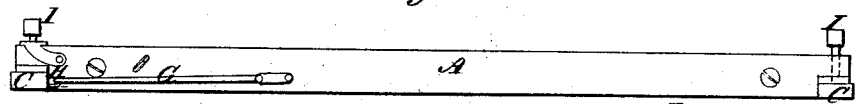

Figure 1 is a plan, or top view.
Figure 2 is an elevation of one end.
Figure 3 is an elevation of one side.

Similar letters of reference in each of the figures indicate like parts.

A is the frame of a horse-power, such as is used for separators, having secured to its side the box B, which is used for holding the stakes and other small implements required in moving and planting the power. The sides of the frame extend beyond the end-pieces, and are cut away so as to form shoulders on the under side of each end. Timbers C C are placed under each end of the frame, the shoulders fitting down upon them. The timbers extend some distance on each side of the power, and have holes through them, through which pins $a\ a$ are driven into the ground.

Metal straps D D are secured to one end of each of these timbers, diagonal to each other, to which are pivoted the two arms E E, the opposite ends of which are provided with shoulders which fit down into a slot, $b$, in the ends of metal bars F F, which pass across each end of the power, and are firmly secured to the timbers on each side. The ends of the arms E E are connected to the frame by pins $e\ e$ passing through the ends of the bars F F, and eyes in the ends of the arms, near the shoulder.

The opposite ends of the timbers C C are secured to the power by means of small metal bars G G attached to the sides of the power, and having their ends formed into hooks which enter eye-bolts H H, which pass through the timbers, thus holding the power on both sides, and preventing the horses, when travelling to the right, from raising the two corners where the bars G G are attached. These bars also relieve a great portion of the side-draught. The screws I I, which pass through the frame, are used to bed the power after it is set in motion.

By this mode of confining horse-powers, one man can arrange the timbers and drive the stakes into the ground while the power is being levelled, when, by simply securing the arms to the corners, as above described, the power is planted and ready for operation. The same facility is found in removing the power, as the number of pieces to be handled is few, and can also be handled by one man.

Having thus described my invention,

What I claim, and desire to secure by Letters Patent, is—

The arrangement of the frame A, with arms E E attached to the timbers C C, the hooks G G, and adjusting-screws I I for fastening the horse-power to the ground, retaining it in position, and levelling it, substantially as herein described.

In witness whereof, I have hereunto set my hand and seal.

RICHARD KNOTT. [L. S.]

Witnesses:
J. O. HINCKLEY,
L. P. MARSHALL.